Oct. 23, 1934.   J. E. McBURNEY   1,977,968
GLASS FURNACE
Filed May 18, 1933   2 Sheets-Sheet 1
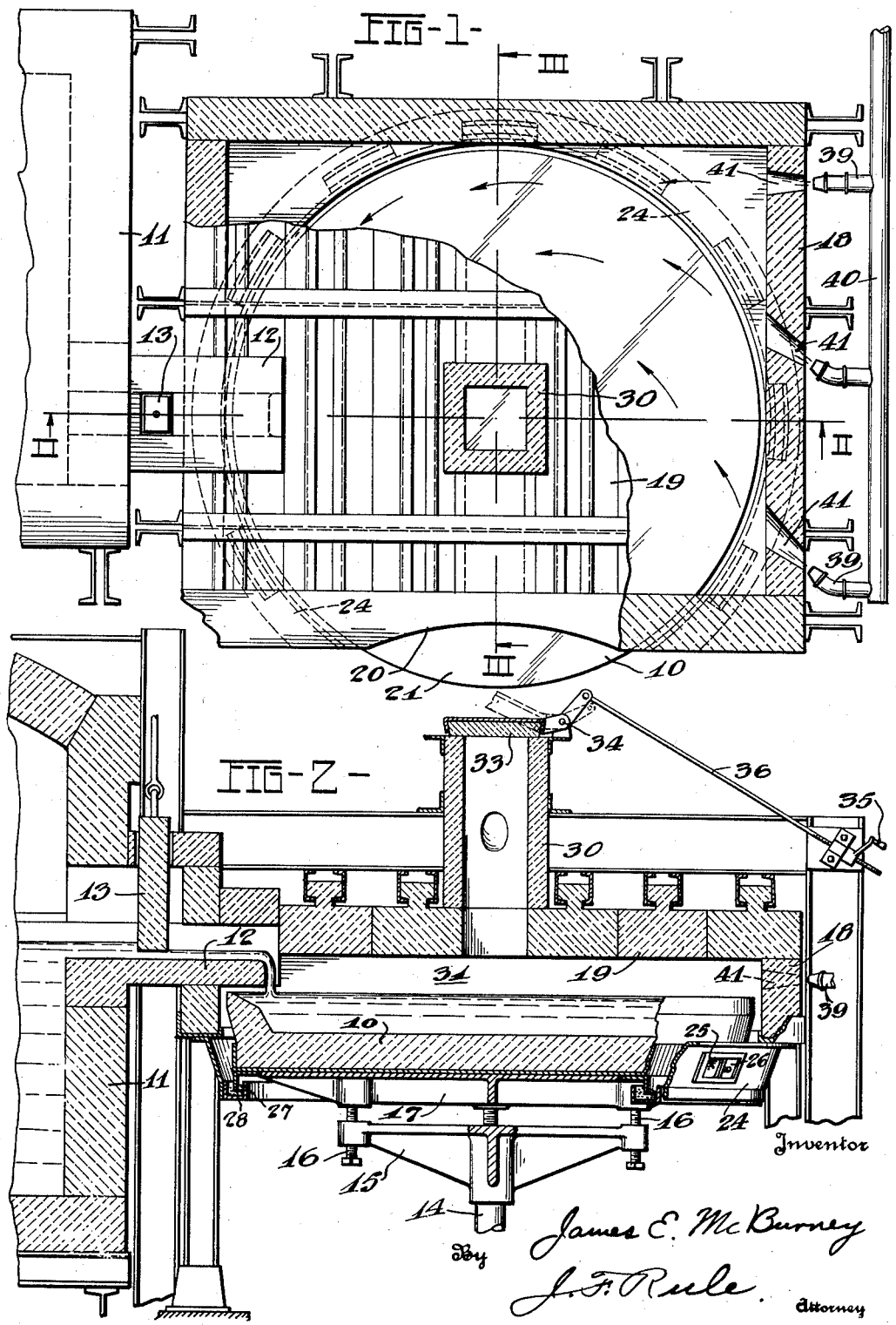

Oct. 23, 1934. J. E. McBURNEY 1,977,968
GLASS FURNACE
Filed May 18, 1933   2 Sheets-Sheet 2
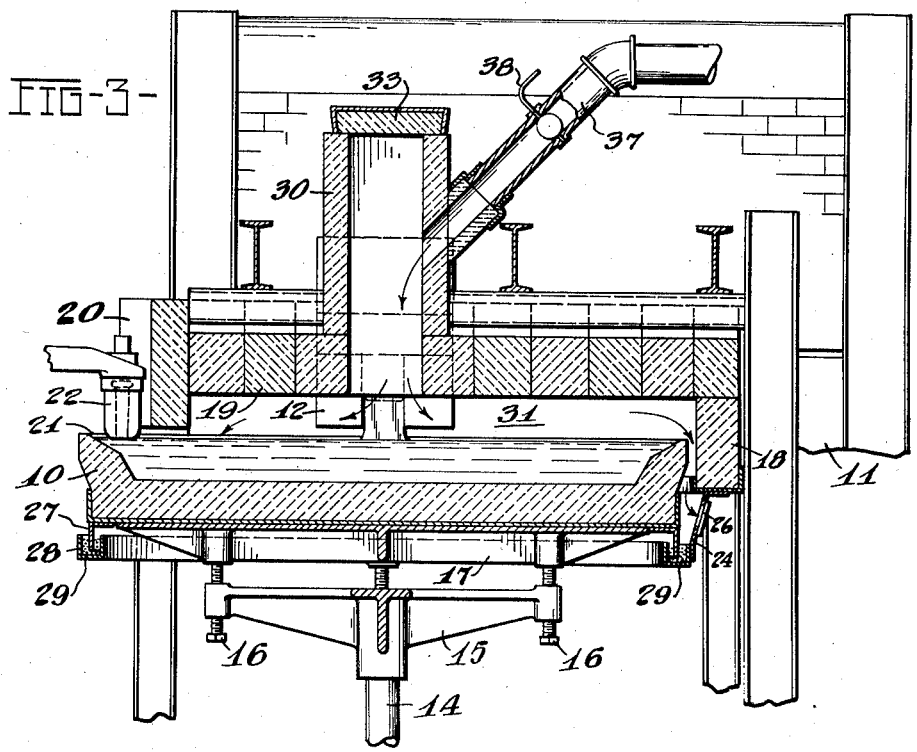
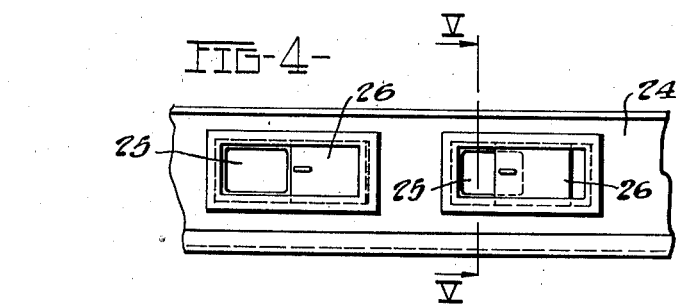
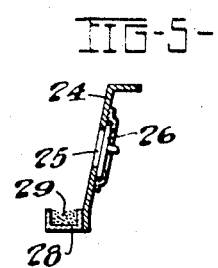
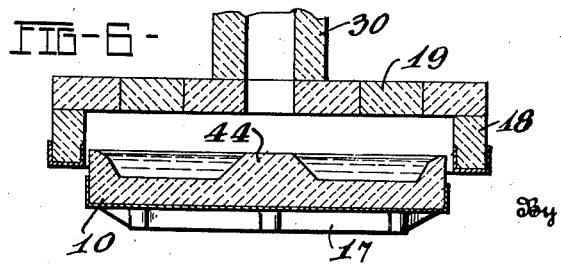
Inventor
James E. McBurney
By J. F. Rule.
Attorney Patented Oct. 23, 1934

1,977,968

UNITED STATES PATENT OFFICE 1,977,968

GLASS FURNACE

James E. McBurney, Alton, Ill., assignor to Owens-Illinois Glass Company, a corporation of Ohio Application May 18, 1933, Serial No. 671,680

18 Claims. (Cl. 49—56)

My invention relates to means for regulating and controlling the temperature of molten glass in tanks, and particularly to the control of glass temperature in revolving tanks or pots of the type in which molten glass is introduced from a melting tank and from which it is gathered as by means of suction gathering molds.

In revolving pots of the conventional type, a stream of glass is ordinarily introduced from the melting furnace at one side of the center of the revolving pot at a point remote from the gathering area, and it is usually necessary either to heat or cool the glass to a certain extent to bring it to the required working temperature by the time it reaches the gathering area. It is highly desirable that the temperature of the glass at the gathering area should be uniform in a direction radially of the pot, and preferably from the edge of the pot to or near the center thereof, so that the glass entering the gathering molds will be of uniform temperature. This is particularly important when plural cavity molds are used, some of which gather their charges of glass from points nearer to the center of the pot than others. With conventional revolving pots, it has been found difficult or impossible to obtain and maintain such uniform temperature.

An object of the present invention is to overcome the above difficulties by the provision of means for obtaining and maintaining a substantially uniform temperature of the glass throughout the gathering area. An aim of the invention is to provide practical means whereby the temperature of the glass may be regulated and controlled in an efficient manner.

Other objects of the invention will appear hereinafter.

In the accompanying drawings:

Fig. 1 is a sectional plan view with parts broken away, showing an apparatus constructed in accordance with the principles of my invention.

Fig. 2 is a sectional side elevation of the same, the section being taken at the line II—II on Fig. 1.

Fig. 3 is a sectional elevation at the line III—III on Fig. 1.

Fig. 4 is a fragmentary elevation showing air ports and dampers located near the rim of the pot.

Fig. 5 is a section at the line V—V on Fig. 4.

Fig. 6 is a sectional elevation showing a modified form of pot.

Referring particularly to Figs. 1, 2 and 3, a revolving pot or tank 10 which may be of usual construction, is supplied with molten glass by a melting or refining tank 11 from which the glass flows in a continuous stream through a trough 12 into the pot at a point adjacent the rim of the pot. The rate of flow is regulated by a vertically adjustable gate 13. The pot is rotated continuously by a vertical drive shaft 14 to which is attached a head 15 on which the pot is mounted. Screw bolts 16 provide an adjustable connection between the head 15 and a base plate 17 which supports the pot, said screw bolts providing means for leveling the pot. The pot is enclosed by a housing of refractory material comprising vertical walls 18 and a roof 19, said housing, as shown, being of rectangular construction. One of the walls 18 is formed with a concave or recessed portion 20 and is positioned to expose a gathering area 21, said wall being shaped to provide the usual jack arch beneath which the glass passes to the gathering area. The glass may be drawn from the pot at the gathering area by molds 22.

Beneath the walls 18 and surrounding the major portion of the pot is an annular casing 24 spaced from the pot to provide a passageway for the circulation of temperature regulating gas, as hereinafter pointed out. Said casing may be attached to the walls 18. The casing is provided at intervals throughout its length with ports 25. Dampers or valves 26 individual to said ports can be operated by hand to close or partially close the ports 25.

A seal is provided between the rotating pot and the lower edge of the stationary casing 24 by means including an angle bar 27 attached to and extending along the bottom margin of the pot. Said angle bar comprises a vertical flange which extends downward into a stationary annular trough 28 attached to and extending along the bottom margin of the casing 24. A sealing medium 29 such as sand, water or other suitable material, is contained in the trough 28 and provides a seal by which air leakage is prevented or reduced to a minimum.

Extending upward from the roof 19 is a conduit 30 which at times may serve as a stack or flue for the upward passage of waste gases, and at other times provides an air duct or passageway for the downward flow of air into the conditioning chamber 31 provided over the glass in the pot by the housing 18, 19. The conduit 30 opens into the chamber 31 preferably directly above or near the center of the revolving pot. The upper end of the stack 30 is closed by a damper 33 hinged at 34 (Fig. 2). The damper is adjustable and may be opened to any desired extent by means of a hand crank 35 threaded to a rod 36 which provides an operating connection from the hand crank to the damper.

An air pressure pipe 37 is connected to any suitable source of air under pressure and opens into the stack 30. A damper 38 in the pipe 37 is adjustable to control the rate of flow of air.

Burners or other heating means may be provided for supplying heat to the shallow conditioning chamber 31 for raising or controlling the temperature of the glass in the pot. As herein shown, burners 39 connected to a manifold 40 are arranged to direct heating flames through ports 41 in a wall 18, into the chamber 31. Burners may also be provided at any other desired points above or along the sides of the chamber 31.

The operation of the apparatus for controlling temperature conditions may be described as follows: If it is desired to increase the temperature of the glass at or near the center of the pot, the damper 33 is opened while the damper 38 remains closed. This permits the hot gases from the burners 39 to be exhausted through the stack 30. These hot gases are thus drawn toward the center of the pot in their passage through the chamber 31 so that the heat is concentrated on the glass in the central portion of the pot. At the same time the dampers 26 may be adjusted for opening the ports 25 a greater or less extent, permitting the passage of outside air to the chamber 31. This cold air operates to cool the glass near the rim of the pot.

If it is desired to cool the glass near the center of the pot, the damper 33 is closed and the damper 38 is opened to a greater or less extent to permit the entrance of cold air through the duct 30 into the chamber 31. The waste gases from the burners will now be exhausted through the ports 25. The burners will thus serve to heat the glass adjacent the rim of the pot while the cold air entering through the pipe 37 is concentrated on the glass at the center of the pot. By varying the adjustments of the dampers, the glass temperatures can be regulated and controlled as desired and a uniform temperature maintained. In practice, the temperature of the glass as it flows from the main tank into the revolving pot, often fluctuates. By adjustably varying the amount of heat supplied by the burners 39 and by adjustment of the dampers as above indicated, such fluctuations in the temperature may be counteracted and a substantially constant and evenly distributed temperature of glass maintained at the gathering area.

Fig. 6 illustrates a modification in which the floor of the revolving pot comprises an elevated portion or island 44 at the center thereof. The stack 30 may be located directly over this island.

Modifications may be resorted to within the spirit and scope of my invention.

What I claim is:

1. The combination of a container for molten glass, a housing over said container providing a conditioning chamber over the glass in the container, a conduit extending from said chamber through the roof of said housing adjacent the center of the container, means for causing a flow of heat regulating gas through said chamber and outward through said conduit, and means for causing an inward flow of heat regulating gas through said conduit into and through said chamber.

2. The combination of a container for molten glass, a housing over said container providing a conditioning chamber over the glass in the container, a conduit extending from said chamber through the roof of said housing adjacent the center of the container, and means for causing a flow of heat regulating gases alternatively in opposite directions through said conduit and chamber.

3. The combination of a container for molten glass, means providing a conditioning chamber over the glass in the container, a conduit opening into said chamber adjacent the center thereof, and means for causing a flow of gas inward through said conduit into said chamber and thence outwardly over the surface of the glass toward the rim of the container.

4. The combination of a container for molten glass, means providing a conditioning chamber over the glass in the container, a conduit opening into said chamber adjacent the center thereof, means for causing a flow of gas inward through said conduit into said chamber and thence outwardly over the surface of the glass toward the rim of the container, and means for causing a flow of gas in the reverse direction through said chamber and conduit.

5. The combination of a container for molten glass, a housing for said container providing a heat conditioning chamber over the glass in the container, means for supplying hot gases to said chamber and applying them to the glass in the chamber, means for directing said gases toward the center of the chamber and withdrawing them from said chamber at a point adjacent the center thereof, and means for changing the direction of movement of said gases and causing them to flow toward the rim of the container.

6. The combination of a container for molten glass, a housing for said container providing a heat conditioning chamber over the glass in the container, and means for causing a circulation of cooling air through said chamber outwardly from the central portion thereof toward the rim of the container.

7. The combination of a container for molten glass, a housing for said container providing a heat conditioning chamber over the glass in the container, means for supplying hot gases to said chamber and applying them to the glass in the chamber, means for directing said gases toward the center of the chamber and withdrawing them from said chamber at a point adjacent the center thereof, means for changing the direction of movement of said gases and causing them to flow toward the rim of the container, and means for causing a circulation of cooling air through said chamber outwardly from the central portion thereof toward the rim of the container.

8. The combination of a rotating pot, means for supplying molten glass thereto, a housing over said pot providing a conditioning chamber over the glass in the pot, burners arranged to supply hot gases to said chamber, a conduit opening into said chamber through the roof of said housing adjacent the center of the pot, through which conduit the gases of combustion from said burners may be directed, an air pressure pipe opening into said conduit, and means for controlling a flow of air through said pipe and conduit into said chamber.

9. The combination of a rotating pot, means for supplying molten glass thereto, a housing over said pot providing a conditioning chamber over the glass in the pot, burners arranged to supply hot gases to said chamber, a conduit opening into said chamber through the roof of said housing adjacent the center of the pot, through which conduit the gases of combustion from said burners may be directed, means for causing a flow of air through the conduit into the conditioning chamber comprising an air pressure pipe opening into said conduit and arranged to direct air downwardly through the conduit, a valve for controlling the flow of air through said pipe, and a separate valve for opening and closing said conduit.

10. The combination of a rotating pot, means for supplying molten glass thereto, a housing over said pot, a flue extending upward from the roof of the housing adjacent the center of the pot, burners arranged to direct heating flames into said housing and over the surface of the glass in the pot, ports opening into said housing adjacent the rim of the pot, and valves controlling said ports and said flue, said valves being adjustable to cause a flow of the gases of combustion alternatively through said flue and through said ports.

11. The combination of a rotating pot, means for supplying molten glass thereto, a housing over said pot, a flue extending upward from the roof of the housing adjacent the center of the pot, burners arranged to direct heating flames into said housing and over the surface of glass in the pot, ports opening into said housing adjacent the rim of the pot, valves controlling said ports and said flue, said valves being adjustable to cause a flow of the gases of combustion alternatively through said flue and through said ports, and means for directing cooling air downward through said flue into contact with the glass and outwardly over the surface of the glass and thence through said ports.

12. The combination of a horizontally rotatable pot, means for supplying molten glass thereto, a housing over said pot providing a heat conditioning chamber over the glass in the pot, an annular series of ports surrounding the pot and opening into the chamber adjacent the rim of the pot, and valves individual to said ports.

13. The combination of a horizontally rotatable pot, means for supplying molten glass thereto, a housing over said pot providing a heat conditioning chamber over the glass in the pot, a conduit opening into said chamber adjacent the center of the pot, an annular series of ports surrounding the pot and opening into the chamber adjacent the rim of the pot, means for supplying burning gases to said chamber for heating the glass in the pot, and means for alternatively directing said gases through said conduit and through said ports.

14. The combination of a horizontally rotatable pot, means for supplying molten glass thereto, a housing over said pot providing a heat conditioning chamber over the glass in the pot, a conduit opening into said chamber adjacent the center of the pot, an annular series of ports surrounding the pot and opening into the chamber adjacent the rim of the pot, valves individual to said ports, a valve in said conduit, and burners arranged to direct burning gases into said chamber and over the surface of the glass in the pot, said valves operable to direct the flow of the gases of combustion alternatively through said conduit and through said ports.

15. The combination of a horizontally rotatable pot, means for supplying molten glass thereto, a housing over said pot providing a heat conditioning chamber over the glass in the pot, a conduit opening into said chamber adjacent the center of the pot, an annular series of ports surrounding the pot and opening into the chamber adjacent the rim of the pot, means for supplying burning gases to said chamber for heating the glass in the pot, means for alternatively directing said gases through said conduit and through said ports, and means for directing a regulated supply of air under pressure through said conduit into the conditioning chamber and thence outwardly through said ports.

16. The combination of a horizontally rotatable pot, means for supplying molten glass thereto, a housing over said pot providing a heat conditioning chamber over the glass in the pot, a conduit opening into said chamber adjacent the center of the pot, an annular series of ports surrounding the pot and opening into the chamber adjacent the rim of the pot, valves individual to said ports, a valve in said conduit, burners arranged to direct burning gases into said chamber and over the surface of the glass in the pot, said valves operable to direct the flow of the gases of combustion alternatively through said conduit and through said ports, and means for directing a regulated supply of air under pressure through said conduit into the conditioning chamber and thence outwardly through said ports.

17. The combination of a horizontally rotating pot, a furnace tank, means for directing a flow of molten glass from the tank into said pot at a point adjacent the rim of the pot, a housing over the pot providing a heat conditioning chamber over the glass in the pot, a flue extending upward from the roof of said housing adjacent the center of the pot, said housing including a channel surrounding the major portion of the pot, ports arranged at intervals along said channel, valves individual to said ports, a valve for closing said flue, means for individually adjusting said valves, an air pressure pipe opening into said flue, and burners arranged to direct burning gases into said chamber.

18. The combination of a rotary pot, means for supplying molten glass thereto, a housing of refractory material comprising a roof and side walls, a stationary casing surrounding the pot beneath the housing and spaced from the pot to provide a channel extending along the exterior side walls of the pot, a trough carried by said casing, a sealing material within said trough, an annular sealing element carried by the pot and projecting downward into said sealing material, ports arranged at intervals along said casing and opening into said channel, and valves individual to said ports.

JAMES E. McBURNEY.